(12) United States Patent
Azuma et al.

(10) Patent No.: US 7,669,891 B2
(45) Date of Patent: Mar. 2, 2010

(54) VEHICLE OCCUPANT PROTECTION SYSTEM

(75) Inventors: Seiji Azuma, Sagamihara (JP); Kouichi Oota, Yamato (JP); Masafumi Ueda, Tokyo (JP)

(73) Assignees: Nissan Motor Co., Ltd., Yokohama-shi (JP); Takata Corporation, Tokyo (JP)

( * ) Notice: Subject to any disclaimer, the term of this patent is extended or adjusted under 35 U.S.C. 154(b) by 0 days.

(21) Appl. No.: 12/434,946

(22) Filed: May 4, 2009

(65) Prior Publication Data

US 2009/0278340 A1    Nov. 12, 2009

(51) Int. Cl.
B60R 21/18    (2006.01)
(52) U.S. Cl. .................. 280/733; 280/729
(58) Field of Classification Search .......... 280/733, 280/729; B60R 21/18
See application file for complete search history.

(56) References Cited

U.S. PATENT DOCUMENTS

| | | | |
|---|---|---|---|
| 3,430,979 A * | 3/1969 | Terry et al. | 280/733 |
| 5,871,230 A * | 2/1999 | Lewis | 280/733 |
| 6,378,898 B1 | 4/2002 | Lewis et al. | |
| 6,511,093 B2 * | 1/2003 | Buerkle et al. | 280/729 |
| 6,957,828 B2 * | 10/2005 | Keeslar et al. | 280/733 |
| 7,163,236 B2 * | 1/2007 | Masuda et al. | 280/733 |
| 7,513,524 B2 * | 4/2009 | Oota et al. | 280/733 |
| 2005/0067820 A1 * | 3/2005 | Keeslar et al. | 280/733 |
| 2006/0028004 A1 * | 2/2006 | Oota et al. | 280/733 |
| 2006/0255573 A1 * | 11/2006 | Tobata et al. | 280/733 |
| 2009/0051150 A1 * | 2/2009 | Murakami | 280/733 |

FOREIGN PATENT DOCUMENTS

| | | | |
|---|---|---|---|
| JP | 2003-519040 A | | 6/2003 |
| JP | 2006044614 A | * | 2/2006 |
| JP | 2006298052 A | * | 11/2006 |
| JP | 2007210420 A | * | 8/2007 |
| WO | WO 01/00456 A1 | | 1/2001 |

* cited by examiner

*Primary Examiner*—Paul N Dickson
*Assistant Examiner*—Jordan Golomb
(74) *Attorney, Agent, or Firm*—Foley & Lardner LLP

(57) ABSTRACT

A vehicle occupant protection system includes: a seat belt apparatus including a shoulder belt (11) and a lap belt (13); an upper air bag (27, 113); a lower air bag (29, 67, 73, 83); and an inflation limiting structure (37, 53, 55, 57, 75, 85) which is provided in the lower air bag and limits inflation of a part of the lower air bag in a vehicle back-and-forth direction when the lower air bag is inflated. When the vehicle collision is detected or predicted, the upper and lower air bags are inflated and vertically come into contact with each other. Further, an upper part (41, 71, 79, 91) of the inflated lower air bag positioned above the inflation limiting structure is pressed by the upper air bag and bends toward the front of the vehicle at the inflation limiting structure.

12 Claims, 12 Drawing Sheets

VEHICLE FORWARD

VEHICLE FORWARD

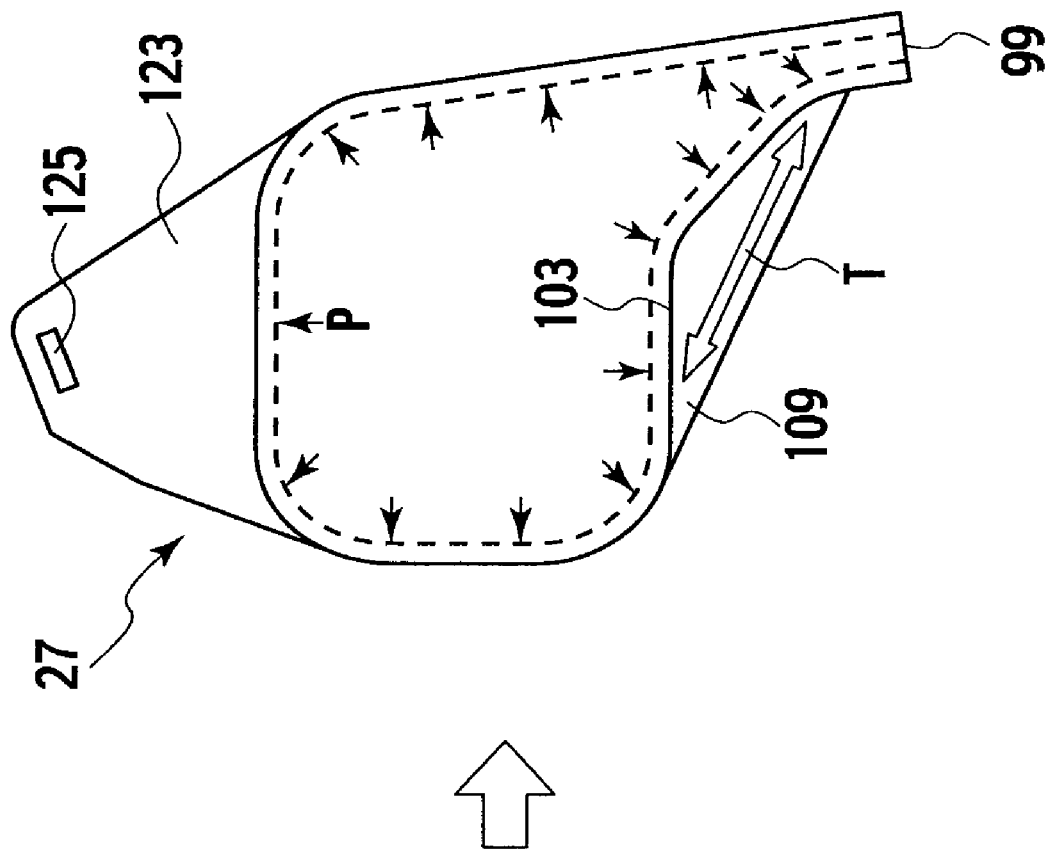
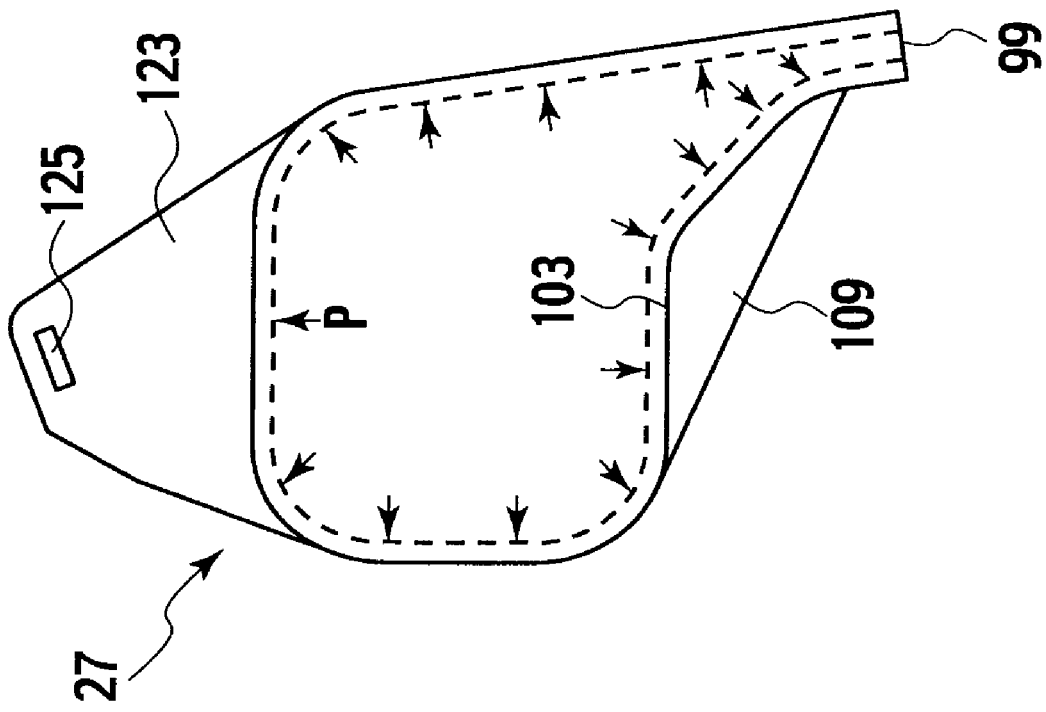

← VEHICLE FORWARD    VEHICLE REARWARD →

VEHICLE OCCUPANT PROTECTION SYSTEM

BACKGROUND OF THE INVENTION

1. Field of the Invention

The present invention relates to a vehicle occupant protection system protecting a vehicle occupant when a vehicle detects or predicts a collision.

2. Description of the Related Art

There is a conventionally known vehicle occupant protection system in which an air bag is equipped in a seat belt and inflated and extended in the case of a frontal collision of a vehicle for protecting a vehicle occupant (see Japanese Patent Translation Publication No. 2003-519040).

In this conventional art, the air bag is equipped in a lap belt constituting the seat belt. The air bag is inflated and extended both in front of the occupant's chest and abdominal and above the occupant's thighs at a collision of the vehicle.

BRIEF SUMMARY OF THE INVENTION

However, in the vehicle occupant protection system of the conventional art, the air bag is inflated from the lap belt toward the occupant (toward the rear of the vehicle). Accordingly, there is a possibility that the vehicle occupant is subjected to inflation force. Moreover, since the distance between the lap belt and the occupant's head is long, it takes a long time for the air bag to be inflated and reach near the head. Accordingly, inertial motion of the head at a vehicle collision cannot be restrained enough.

The present invention was made in the light of such problems of the conventional art. An object of the present invention is to provide a vehicle occupant protection system in which the inflation force of the air bag applied to the occupant is efficiently reduced and the inertial motion of the occupant's head can be restrained.

The first aspect of the present invention provides a vehicle occupant protection system comprising: a seat belt apparatus comprising: a shoulder belt restraining an occupant of a vehicle diagonally from one of shoulders to a chest; and a lap belt restraining a waist of the occupant; an upper air bag which is housed in the shoulder belt, and is inflated from the shoulder belt toward a front of the vehicle upon detection or prediction of a vehicle collision; a lower air bag which is housed in the lap belt, and is inflated from the lap belt toward the front of the vehicle upon detection or prediction of the vehicle collision; and an inflation limiting structure which is provided in the lower air bag and limits inflation of a part of the lower air bag in a vehicle back-and-forth direction when the lower air bag is inflated, wherein when the vehicle collision is detected or predicted, the upper and lower air bags are inflated and vertically come into contact with each other, and an upper part of the inflated lower air bag positioned above the inflation limiting structure is pressed by the upper air bag and bends toward the front of the vehicle at the inflation limiting structure.

The second aspect of the present invention provides a vehicle occupant protection system comprising: a seat belt apparatus comprising: a shoulder belt restraining an occupant of a vehicle diagonally from one of shoulders to a chest; and a lap belt restraining a waist of the occupant; an upper air bag which is housed in the shoulder belt, and is inflated from the shoulder belt toward a front of the vehicle upon detection or prediction of a vehicle collision; a lower air bag which is housed in the lap belt, and is inflated from the lap belt toward the front of the vehicle upon detection or prediction of the vehicle collision; and inflation limiting means provided in the lower air bag, the inflation limiting means for limiting inflation of a part of the lower air bag in a vehicle back-and-forth direction when the lower air bag is inflated, wherein when the vehicle collision is detected or predicted, the upper and lower air bags are inflated and vertically come into contact with each other, and an upper part of the inflated lower air bag positioned above the inflation limiting means is pressed by the upper air bag and bends toward the front of the vehicle at the inflation limiting means.

BRIEF DESCRIPTION OF THE SEVERAL VIEWS OF THE DRAWING

FIGS. 4A to 4C show a first inflation limiting structure of FIG. 3, a second inflation limiting structure, and a third inflation limiting structure, respectively.

FIGS. 7A and 7B are schematic views explaining tension applied to the upper air bag according to the first embodiment. FIG. 7A shows a pressure condition within the upper air bag when fluid is flown into the upper air bag, and FIG. 7B shows tension applied to a first bending guide structure.

FIGS. 9A to 9C show a first phase after detection or prediction of a vehicle collision, a second phase, and a final phase when the lower air bag is bent, respectively.

DETAILED DESCRIPTION OF THE INVENTION

Hereinafter, description will be made of embodiments of the present invention with reference to the drawings.

First Embodiment

Figure 1:
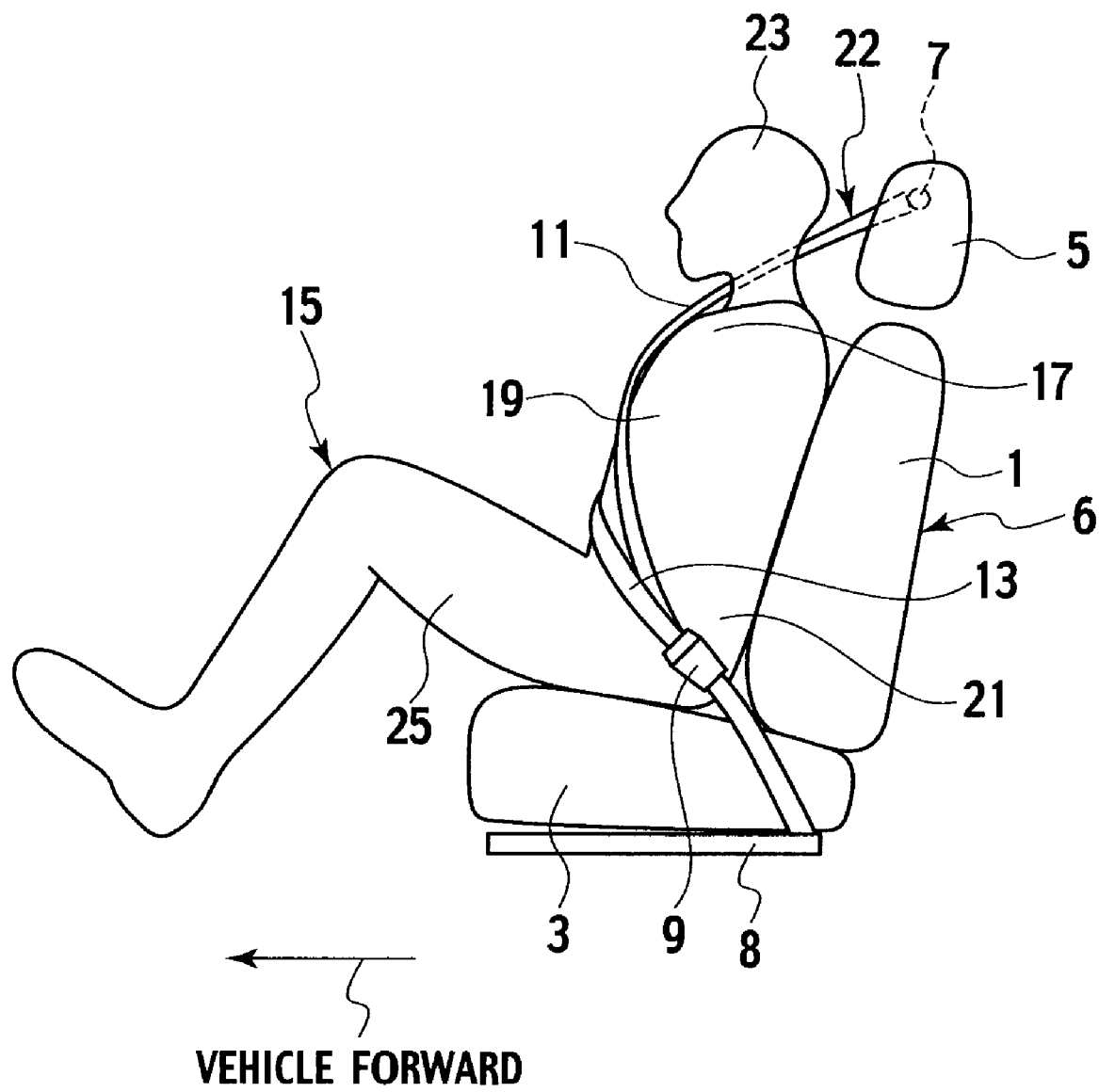
FIG. 1 is a side view showing an occupant in a seat belt apparatus according to a first embodiment of the present invention.

FIG. 1 is a side view showing an occupant in a seat belt apparatus of a vehicle occupant protection system according to a first embodiment of the present invention. In this embodiment, a description is given of a vehicle occupant protection system provided on the right one of rear seats as an example. However, the present invention can be applied to seats located at other positions.

In the vehicle occupant protection system according to the first embodiment, upper and lower air bags are inflated upon detection or prediction of a vehicle collision. Herein, the "detection or prediction of a vehicle collision" widely includes, in addition to detection of a collision load applied to the vehicle, detection of deceleration of the vehicle, detection of a contact of the vehicle with an obstacle, or prediction of a collision with an obstacle by means of an exterior detector such as an ultrasonic sensor, a laser radar or a camera.

The vehicle includes a vehicle seat 6 on a floor with a rail 8 interposed therebetween. The vehicle seat 6 includes a seatback 1, a seat cushion 3, and a headrest 5. A seat belt apparatus 22 in this embodiment is a 3-point seat belt and is supported at three points: a shoulder anchor 7 provided on the upper right of an occupant 15 (in upper part outside of the occupant 15 in the vehicle width direction); a not-shown lap anchor on the lower right of the occupant 15 (in lower part outside of the occupant 15 in the vehicle width direction); and a not-shown buckle anchor on the lower left of the occupant 15 (in lower part inside of the occupant 15 in the vehicle width direction). These shoulder anchor 7, lap anchor, and buckle anchor may be attached to either a vehicle body or the vehicle seat 6.

The seat belt apparatus 22 includes a shoulder belt 11 and a lap belt 13. The shoulder belt 11 extends from the shoulder anchor 7 to a buckle 9 and restrains the occupant 15 diagonally from one of shoulders 17 to a chest 19. The lap belt 13 restrains a waist 21 of the occupant 15. In FIG. 1, reference numerals 23 and 25 indicate a head and thighs of the occupant 15, respectively.

Figure 2:
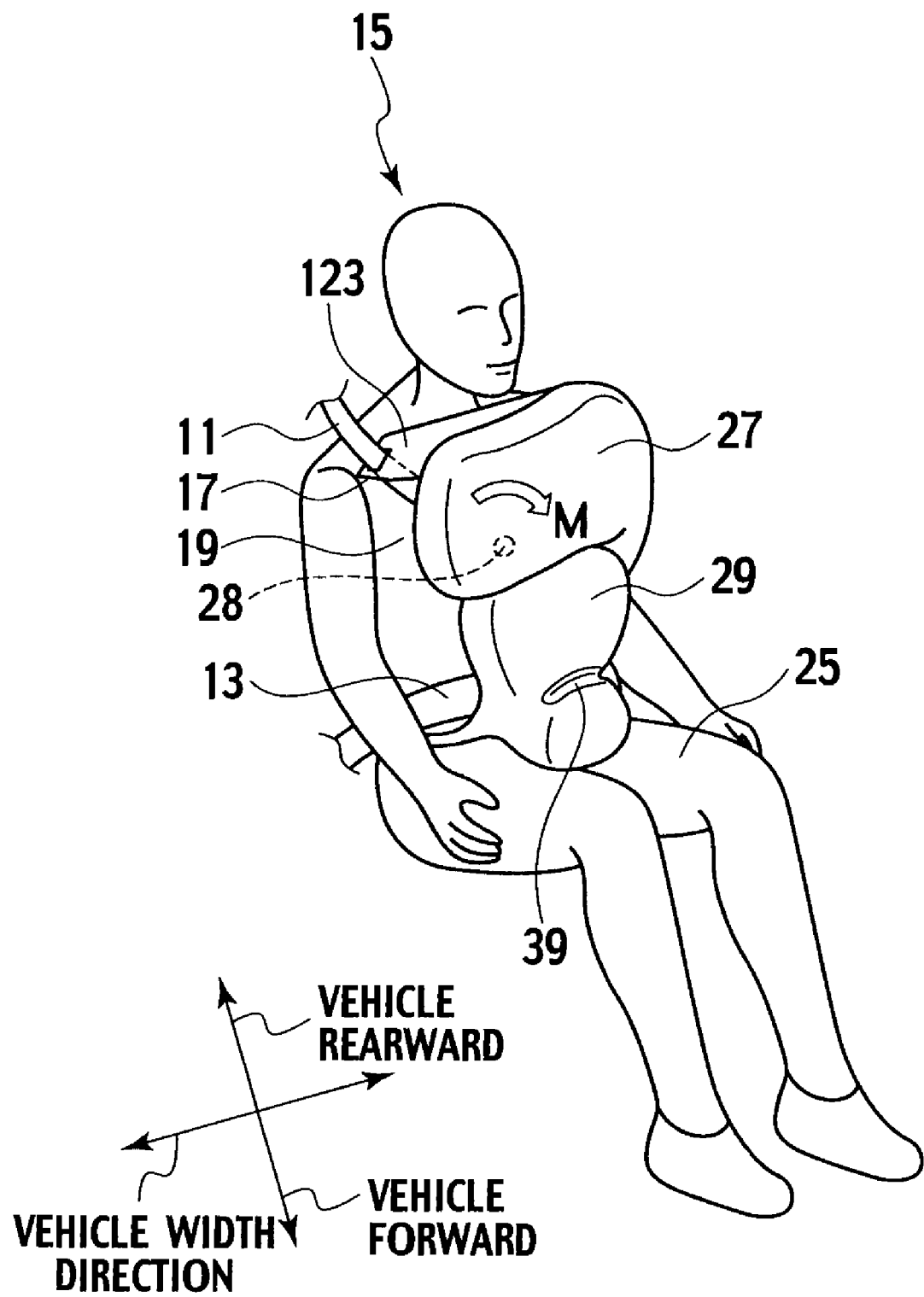
FIG. 2 is a perspective view showing inflated upper and lower air bags according to the first embodiment.

FIG. 2 is a perspective view showing inflated upper and lower air bags according to the first embodiment. When the vehicle detects or predicts a collision, upper and lower air bags 27 and 29 shown in FIG. 2 are inflated toward the front of the vehicle. Specifically, the upper air bag 27 is normally stored in the shoulder belt 11 (except in the case where the vehicle detects or predicts a collision) and is then inflated from the shoulder belt 11 toward the front of the vehicle when the vehicle detects or predicts a collision. The lower air bag 29 is also normally stored in the lap belt 13 and is inflated from the lap belt 13 toward the front of the vehicle when the vehicle detects or predicts a collision. These inflated upper and lower air bags 27 and 29 come into contact with each other in the vertical direction.

Figure 3:
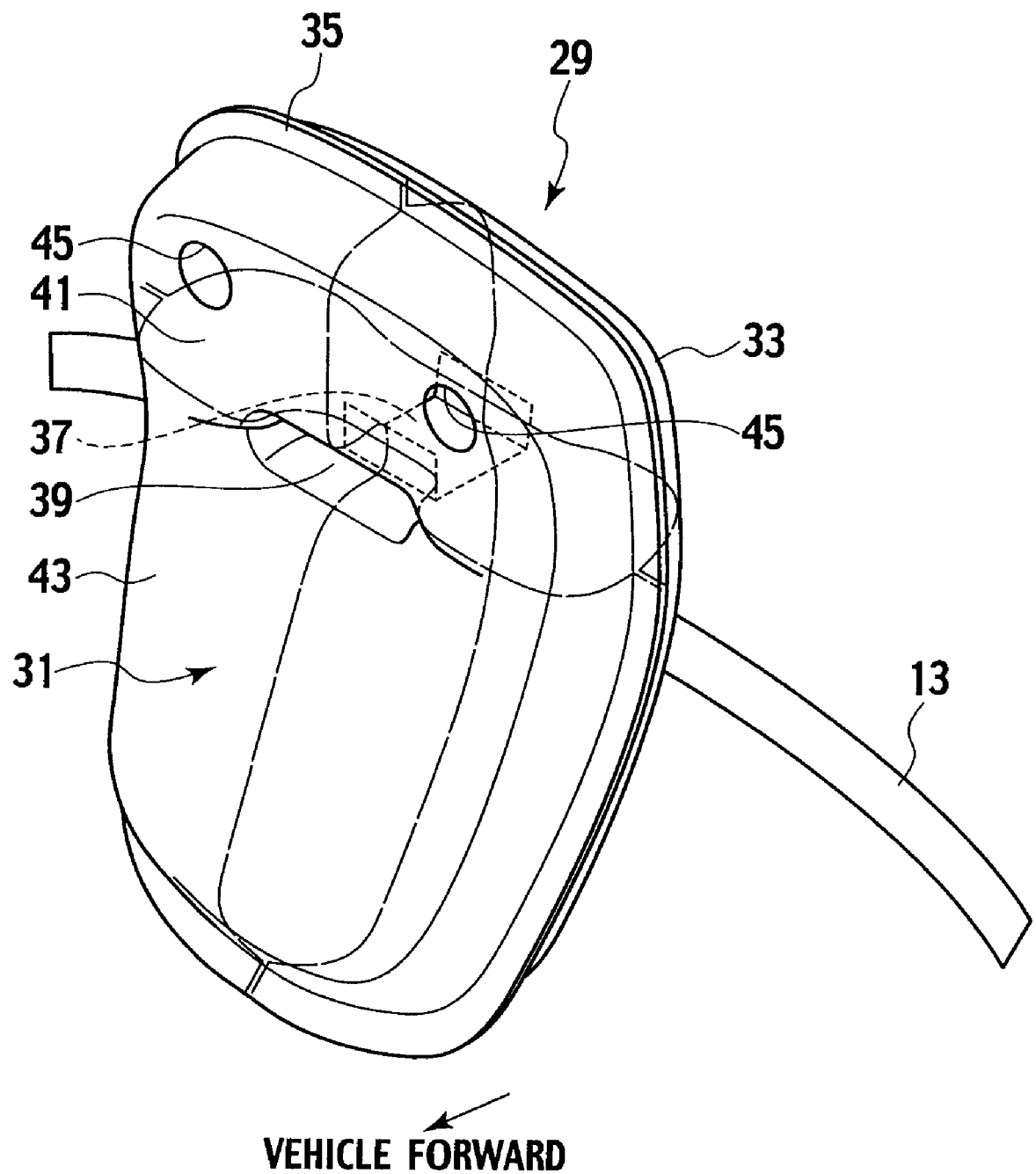
FIG. 3 is an enlarged perspective view of the lower air bag of FIG. 2.

FIG. 3 is an enlarged perspective view of the lower air bag of FIG. 2. The lower air bag 29 includes a front sheet member 31 and a rear sheet member 33 which are laid on each other and whose edges 35 are joined by sewing and the like. In upper part of the front sheet member 31, a pair of right and left round vent holes 45 and 45 are formed.

The inner surface of the front sheet member 31 and the inner surface of the rear sheet member 33 are connected in a vehicle back-and-forth direction by a first inflation limiting structure 37 formed into a sheet. In this manner, the first inflation limiting structure 37 is provided within the lower air bag 29, and the portions of the front and rear sheet members 31 and 33 to which the first inflation limiting structure 37 is attached are pulled inward in the vehicle back-and-forth direction of the lower air bag 29. Accordingly, the thickness of the lower air bag 29 in the vehicle back-and-forth direction is smaller at the portion to which the first inflation limiting structure 37 is attached than at the other portion. A depression 39 is thus formed in the outer surface of the lower air bag 29.

At inflation of the lower air bag 29, the first inflation limiting structure 37 limits inflation of the lower air bag 29 in the vehicle back-and-forth direction. A part of the lower air bag 29 above the first inflation limiting structure 37 is referred to as an upper part 41, and a part of the lower air bag 29 below the first limiting structure 37 is referred to as a lower part 43. As described above, the thickness of the lower air bag 29 in the vehicle back-and-forth direction is thinner at the portion to which the first inflation limiting structure 37 is attached than at the other portion. Accordingly, the inflated upper part 41 easily bends with respect to the lower part 43 at the portion to which the first inflation limiting structure 37 is attached.

Figure 4A:
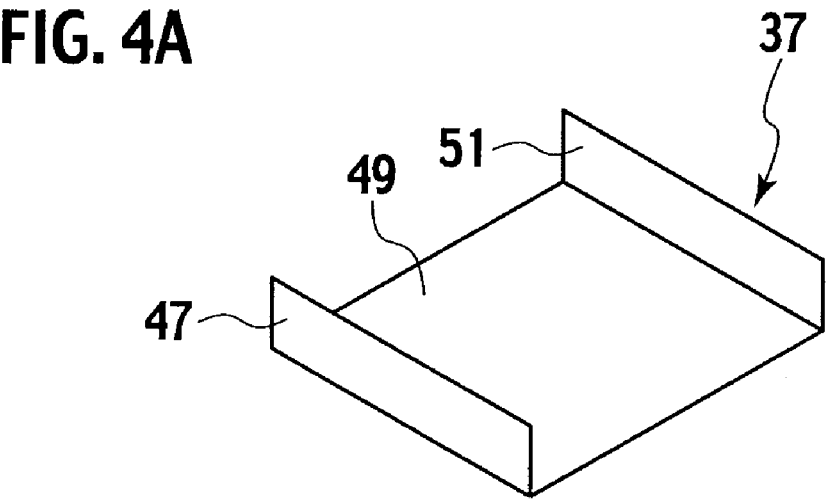
FIGS. 4A to 4C are perspective views showing inflation limiting structures provided in the lower air bag according to the first embodiment.
Figure 4B:
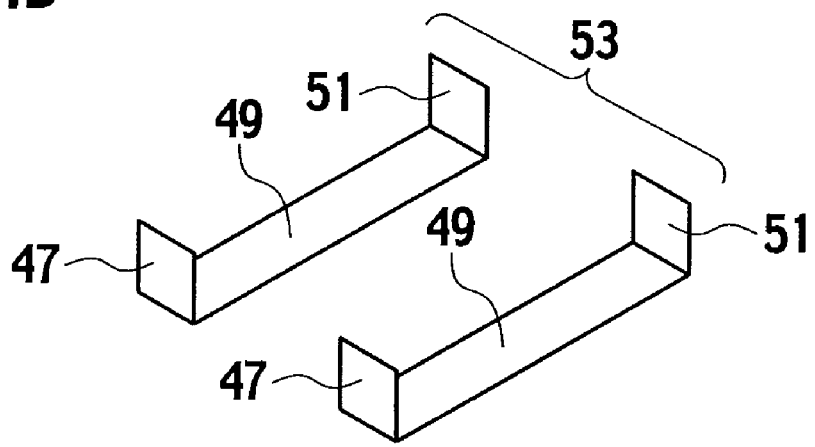
Figure 4C:
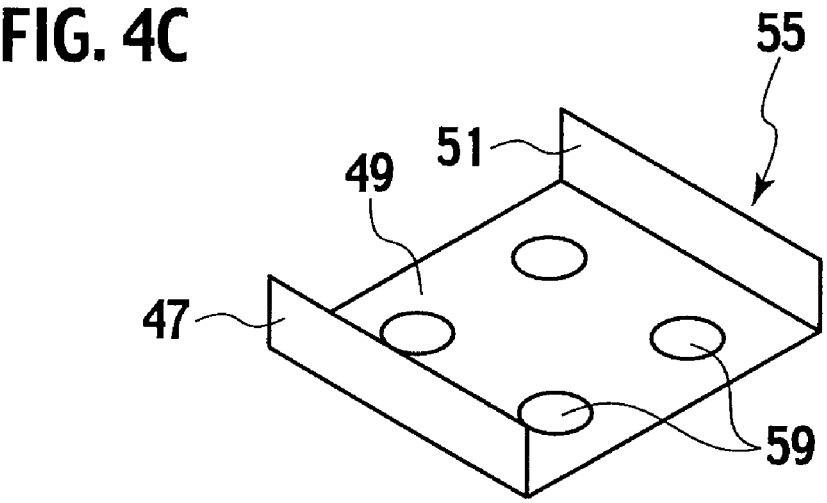

FIGS. 4A to 4C are perspective views showing inflation limiting structures provided in the lower air bag according to the first embodiment. FIGS. 4A to 4C show the first inflation limiting structure of FIG. 3, a second inflation limiting structure, and a third inflation limiting structure, respectively.

As shown in FIG. 4A, the first inflation limiting structure 37 is composed of a sheet member of cloth and the like. The first inflation limiting structure 37 includes a front joint part 47 which is placed on the front side and extends in the vertical direction, a connection part 49 extending from the lower end of the front connection part 47 to the rear, and a rear joint part 51 extending upward from the rear end of the connection part 49. The front and rear joint parts 47 and 51 and connection part 49 are integrally formed so as to have a U-shape when viewed from the side.

As shown in FIG. 4B, a second inflation limiting structure 53 is composed of two long and thin belt-like sheet members. Each of the sheet members includes the front joint part 47, connection part 49, and rear joint part 51 which are integrally formed and have a substantially U-shape when viewed from the side. The second inflation limiting structure 53 composed of the two belt-like sheet members in this manner can be prevented from inhibiting fluid transfer between the upper and lower parts 41 and 43 of the lower air bag 29.

Furthermore, as shown in FIG. 4C, a third inflation limiting structure 55 includes four round communication holes 59 formed in the connection part 49 in the first inflation limiting structure 37. Provision of the communication holes 59 can prevent the fluid transfer between the upper and lower parts 41 and 43 of the lower air bag 29 from being inhibited.

Figure 5:
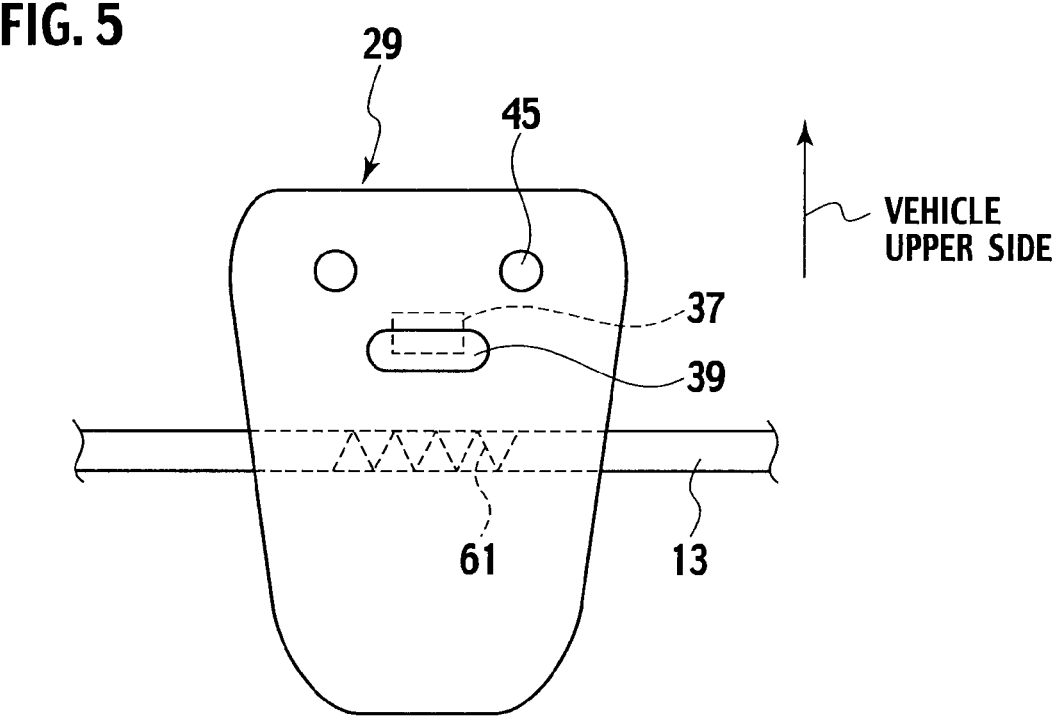
FIG. 5 is a front view showing the inflated lower air bag according to the first embodiment.

FIG. 5 is a front view showing the inflated lower air bag according to the first embodiment. The inflated lower air bag 29 is substantially rectangular when viewed from the front. The lower air bag 29 is fixed to the lap belt 13 through a lower air bag attachment 61. Specifically, the lower air bag attachment 61 is sewed and fixed to the lap belt 13. When the inflated lower air bag 29 is inflated, the first inflation limiting structure 37 is positioned above the lower air bag attachment 61.

Figure 6:
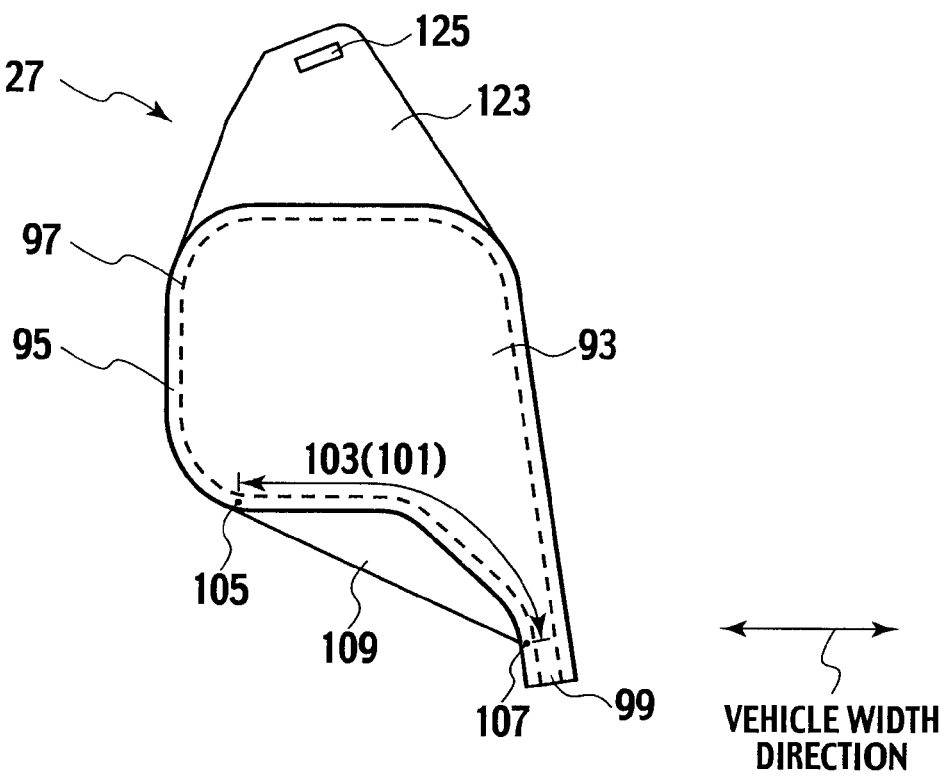
FIG. 6 is a front view showing the uninflated upper air bag according to the first embodiment.

FIG. 6 is a front view showing the uninflated upper air bag provided with a first bending guide structure according to the first embodiment. The uninflated upper air bag 27 is integrally composed of an upper air bag body 93 provided at the vertical center, a first bending guide structure 109 provided under the upper air bag body 93, and an extension 123 provided above the upper air bag body 93.

The upper air bag 27 is formed into a bag by sewing edges 95 of two sheet members. At the bottom of the upper air bag 27, an inflow port 99 is provided. A sewing line 97 is provided in a substantially rectangular shape along the edges 95 when viewed from the front. The bottom part of the upper air bag body 93 is formed into a recess 103 (a concave part 101) protruding inward in a substantially V-shape. The first bending guide structure 109 is provided so as to connect ends 105 and 107 of the recess 103. Herein, the end 105 is the edge of the recess 103, which is the inwardly recessed part of the outer surface of the inflated upper air bag 27, on the side including the shoulder anchor 7 of the shoulder belt 11. That is, the end 105 is the edge of the recess 103 on the side of one of the right and left shoulders 17 of the occupant 15 restrained by the shoulder belt 11. The end 107 is the edge of the recess 103, which is the inwardly recessed part of the outer surface of the inflated upper air bag 27, on the side including the buckle 9 of the shoulder belt 11. That is, the end 107 is the edge of the recess 103 on the side of one of the right and left shoulders 17 of the occupant 15 which is not restrained by the shoulder belt 11.

Specifically, the first bending guide structure 109 is a part of at least one of the two sheet members cut into a substantially triangle. In this embodiment of FIG. 6, the front sheet member is cut so that a part of the rear sheet member is left in a substantially triangle, thus forming the first bending guide structure 109. The first bending guide structure 109 is provided at the bottom of the inflated upper air bag 27 so as to connect the side including the shoulder anchor 7 and the side including the buckle 9. In this manner, the upper air bag 27 is composed of the extension 123, the upper air bag body 93 and the first bending guide structure 109 provided at the bottom of the upper air bag body 93 so as to extend in the vehicle width direction. The upper air bag body 93 is inflated when the upper air bag body 93 is supplied with fluid, for example such as nitrogen gas, through the inflow port 99.

The extension 123 is a part of at least one of the two sheet members cut into a substantially trapezoid. At the top of the extension 123, a rectangular insertion opening 125 through which the shoulder belt 11 (webbing) is inserted is formed. The insertion opening 125 is large enough to allow the shoulder belt 11 to be inserted therethrough and to allow the inserted shoulder belt 11 to move. In such a manner, in this embodiment, the upper part of the inflated upper air bag 27 is supported so as to move with respect to the shoulder belt 27.

FIGS. 7A and 7B are schematic views explaining tension applied to the upper air bag according to the first embodiment. FIG. 7A shows a pressure condition within the upper air bag when the fluid is flown into the upper air bag, and FIG. 7B shows tension applied to the first bending guide structure because of the pressure within the upper air bag.

When the fluid is supplied through the inflow port 99 formed at the bottom of the upper air bag 27, the upper air bag 27 is inflated. Each portion of the inner surface of the inflated upper air bag 27 is subjected to uniform pressure P as shown by arrows of FIG. 7A. Herein, as described above, the recess 103, whose outer surface is recessed inward when the upper air bag 27 is inflated, is provided. The recess 103 is pressed outward by the pressure P. The ends 105 and 107 of the recess 103 therefore try to be separated from each other. Accordingly, as shown in FIG. 7B, tension T acts on the first bending guide structure 109 in the direction of an arrow (in the longitudinal direction of the first bending guide structure 109).

Figure 8:
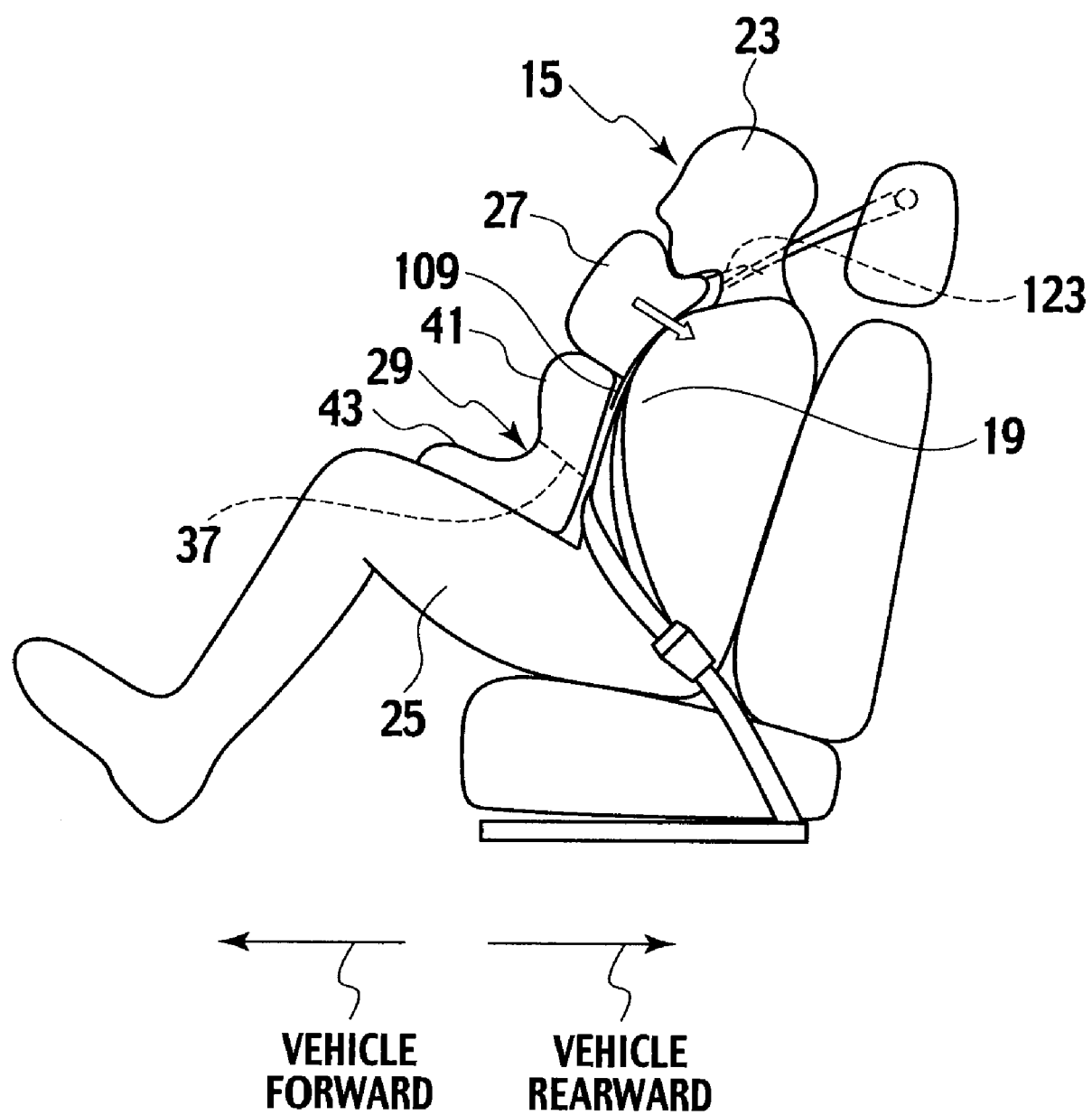
FIG. 8 is a side view showing the inflated upper and lower air bags according to the first embodiment.

FIG. 8 is a side view of the inflated upper and lower air bags according to the first embodiment. When the upper and lower air bags 27 and 29 are inflated, as shown in FIG. 8, the first bending guide structure 109 extends downward from the bottom of the upper air bag 27. The first bending guide structure 109 is then inserted into the vehicle rear side of the upper part 41 of the inflated lower air bag 29, or between the upper part 41 of the inflated lower air bag 29 and the occupant 15. The first bending guide structure 109 is an uninflated portion of the upper air bag 27 in this manner. As shown in FIG. 8, when the upper and lower air bags 27 and 29 are inflated, the upper part of the upper air bag 27 which tries to be separated from the occupant 15 because of the inflation is drawn toward the rear of the vehicle (toward the occupant 15) by the extension 123 through which the shoulder belt 11 is inserted. Specifically, the upper part of the upper air bag 27 is drawn in a direction of an arrow of FIG. 8 to maintain the substantially-constant distance between the upper part and the shoulder belt 11. Thus, the upper air bag 27 is not separated from the chest 19 of the occupant 15.

Figure 9:
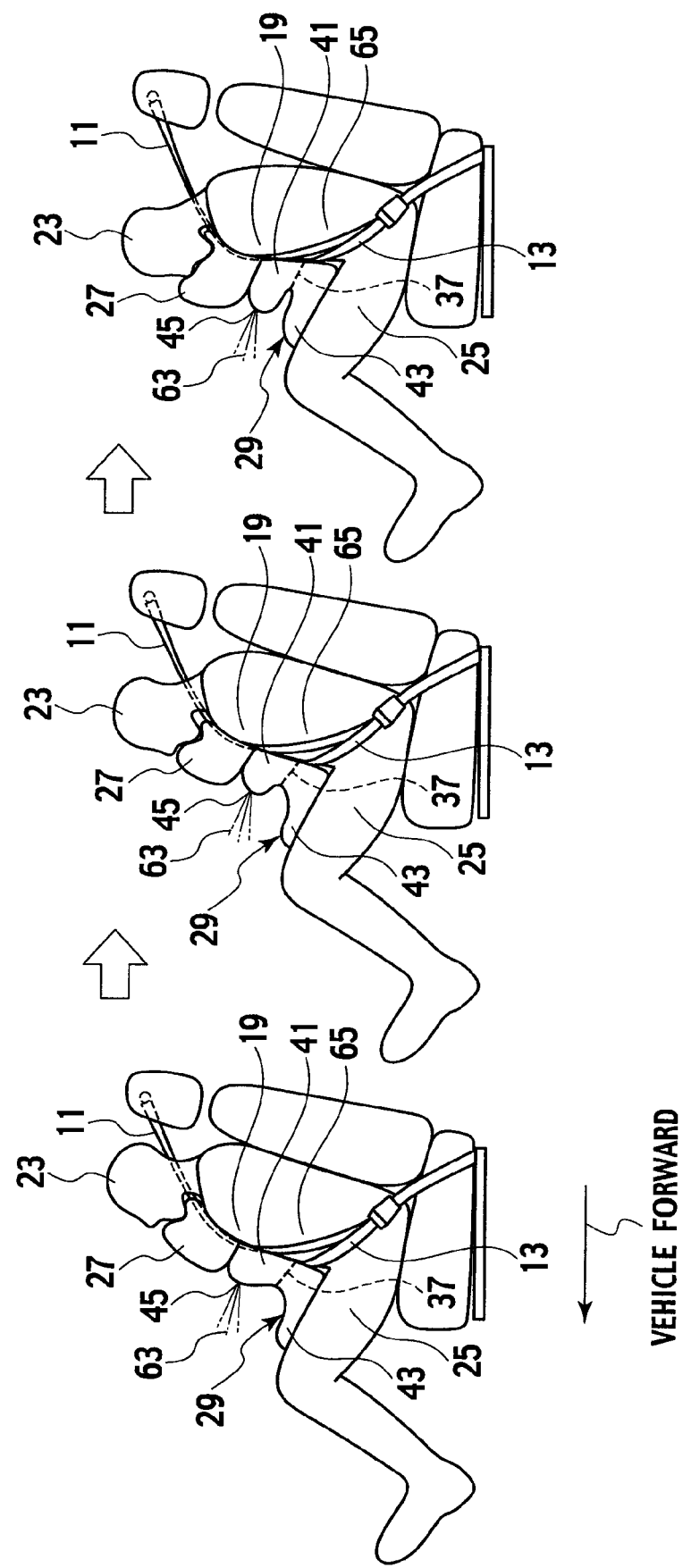
FIGS. 9A to 9C are side views showing an operation of the vehicle occupant protection system according to the first embodiment.

FIGS. 9A to 9C are side views showing the operation of the vehicle occupant protection system according to the first embodiment. FIG. 9A shows a first phase after detection or prediction of a vehicle collision, FIG. 9B shows a second phase, and FIG. 9C shows a final phase where the lower air bag is bent.

As shown in FIG. 9A, when the vehicle detects or predicts a collision, the upper air bag 27 is inflated from the shoulder belt 11 toward the front of the vehicle, and the lower air bag 29 is inflated from the lap belt 13 toward the front of the vehicle. Herein, the lower air bag 29 is also inflated upward. Accordingly, the lower air bag 29 comes into contact with the bottom surface of the upper air bag 27 in the vertical direction. Moreover, in the front surface of the lower air bag 29, the vent holes 45 are formed. Fluid (for example, gas) 63 within the lower air bag 29 is discharged through the vent holes 45 toward the front of the vehicle.

As shown in FIGS. 9B and 9C, when inertia force is applied to the occupant 15, the head 23 tries to move toward the front of the vehicle. However, the upper air bag 27 restricts the forward movement of the head 23. Herein, the lower air bag 29 is provided with the first inflation limiting structure 37 as described above. The lower air bag 29 is pressed down by the upper air bag 27 and also pressed up by the thighs 25. Accordingly, the upper part 41 of the lower air bag 29 bends toward the front of the vehicle with respect to the lower part 43 at the first inflation limiting structure 37. Even when the lower air bag 29 is bent, the vent holes 45 are not narrowed, and the fluid 63 is discharged toward the front of the vehicle.

Figure 10:
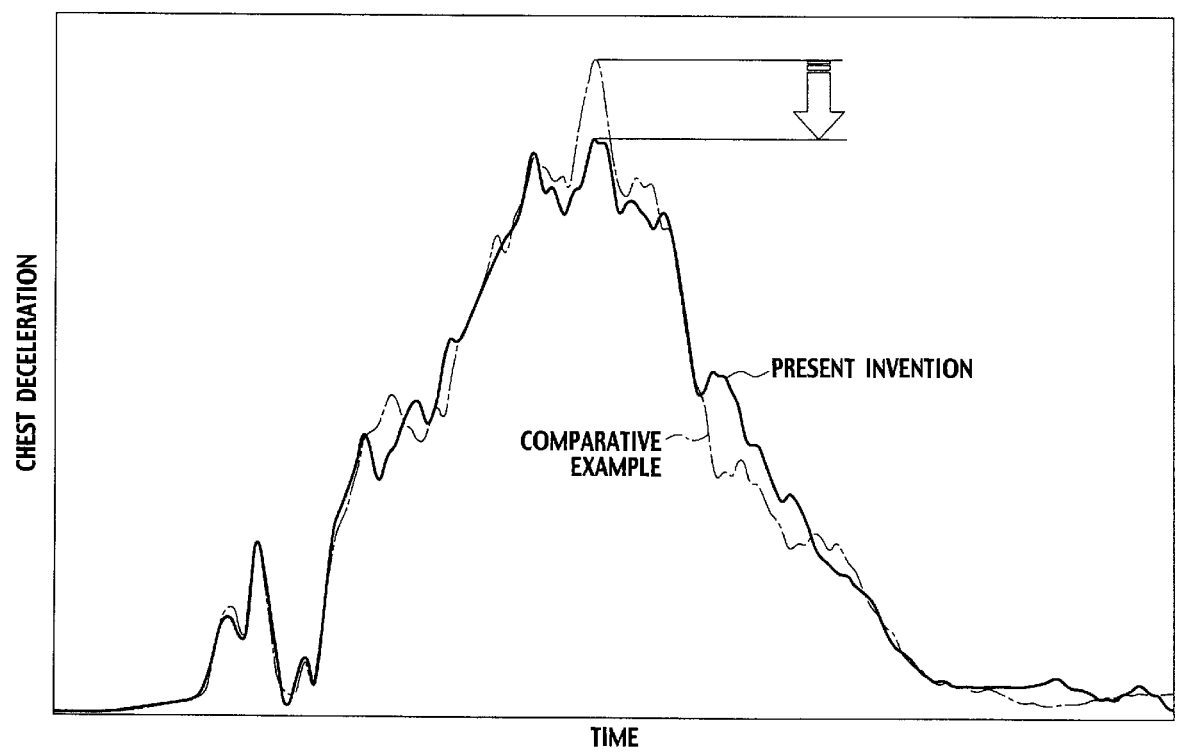
FIG. 10 is a graph showing a relationship between deceleration of the occupant's chest and time when a vehicle collision is detected or predicted. A solid line indicates an example of the present invention including the vehicle occupant protection system according to the first embodiment, and a dashed-dotted line indicates a comparative example not including the vehicle occupant protection system.

FIG. 10 is a graph showing a result of a vehicle frontal collision test. Specifically, the vertical axis indicates deceleration of the occupant's chest after detection or prediction of a vehicle collision, and the horizontal axis indicates time. The solid line indicates a case with the vehicle occupant protection system according to the first embodiment (an example of the present invention), and the dashed-dotted line indicates a case without the vehicle occupant protection system according to the first embodiment (a comparative example).

As shown in this graph, the maximum value of the deceleration of the occupant's chest in the example of the present invention with the vehicle occupant protection system according to the first embodiment is smaller than that in the comparative example. The test result confirms that the inflation limiting structure reduces the inflation force of the upper and lower air bags 27 and 29 which is applied to the occupant 15 upon detection or prediction of the vehicle collision.

Hereinafter, a description is given of advantageous effects of the vehicle occupant protection system according to the first embodiment.

In this embodiment, the seat belt apparatus 22 is provided, which includes the shoulder belt 11 restraining the occupant 15 diagonally from one of the shoulders 17 to the chest 19 and the lap belt 13 restraining the waist 21 of the occupant 15.

Furthermore, in this embodiment, the vehicle occupant protection system includes: the upper air bag 27, which is provided in the shoulder belt 11 and is inflated from the shoulder belt 11 toward the front of the vehicle upon detection or prediction of a vehicle collision; and the lower air bag 29, which is provided in the lap belt 13 and is inflated from the lap belt 13 toward the front of the vehicle upon detection or prediction of a vehicle collision. Moreover, in this embodiment, the vehicle occupant protection system includes the first inflation limiting structure 37, which is provided in the lower air bag 29 and limits inflation of the lower air bag 29 in the vehicle back-and-forth direction when the lower air bag 29 is inflated. The upper and lower air bags 27 and 29 are inflated upon detection or prediction of a vehicle collision and come into contact with each other in the vertical direction, and the upper part 41 of the inflated lower air bag 29, which is positioned above the first inflation limiting structure 37, is pressed by the upper air bag 27 to bend toward the front of the vehicle at the first inflation limiting structure 37.

The lower air bag 29 is inflated upon detection or prediction of a vehicle collision, and the upper part 41 of the lower air bag 29 comes into contact with the bottom surface of the upper air bag 27 which is also inflated. Thereafter, the upper air bag 27 receives load from the head 23. The load presses down the upper part 41 of the lower air bag 29 which is in contact with the upper air bag 27. At this time, the upper part 41 of the lower air bag 29 is configured to easily bend toward the front or rear at a trigger portion which is prevented by the inflation limiting structure 37 from being inflated toward the front and rear. Accordingly, the upper part 41 of the lower air bag 29 bends toward the front of the vehicle at the first inflation limiting structure 37. This can cause the upper part 41 of the lower air bag 29 to be inflated toward the front of the vehicle. Accordingly, the upper part 41 of the lower air bag 29 is less inflated toward the occupant 15, and it is possible to reduce the inflation force of the lower air bag 29 applied to the occupant 15.

Moreover, the lower air bag 29 is attached to the lap belt 13 through the lower air bag attachment 61. When the lower air bag 29 is inflated, the first inflation limiting structure 37 is positioned above the lower air bag attachment 61 provided at the lap belt 13 restraining the waist 21 of the occupant. Accordingly, it is possible to limit the inflation of the lower air bag 29 in the vehicle back-and-forth direction in front of the abdominal 65 and chest 19 positioned above the waist 21 of the occupant 15. The chest 19 and abdominal 65 of the occupant 15 are therefore less likely to be subjected to inflation force of the lower air bag 29.

Furthermore, the lower air bag 29 is provided with the vent holes 45. The fluid 63 within the lower air bag 29 is discharged toward the front of the vehicle through the vent holes 45 when the lower air bag 29 is bent toward the front of the vehicle at the first inflation limiting structure 37. Since the fluid 63 is discharged toward the front of the vehicle in such a manner, the discharged fluid 63 does not strike the body of the occupant 15, such as the head 23, for example. Moreover, even when the lower air bag 29 is bent, the vent holes 45 are not narrowed, and the fluid can be reliably discharged.

Moreover, since the vent holes 45 are provided on the upper part 41 of the lower air bag 29, which is positioned above the lower part 43, for example, even in the case where the lower part 43 enters between the right and left thighs 25 and the like, the vent holes 45 are not narrowed. Accordingly, the fluid 63 is reliably discharged toward the front of the vehicle through the vent holes 45.

Still furthermore, the upper air bag 27 is provided with the first bending guide structure 109 as the guide allowing the upper part 41 of the inflated lower air bag 29 to bend toward the front of the vehicle. By the first bending guide structure 109, the lower air bag 29 can be reliably bent. The occupant 15 is therefore less likely to be subjected to inflation force of the lower air bag 29.

The first bending guide structure 109 extends downward from the bottom of the inflated upper air bag 27 and is placed on the vehicle rear side of the upper part 41 of the inflated lower air bag 29.

Herein, without the first bending guide structure 109, the upper part 41 of the inflated lower air bag 29 may enter the vehicle rear side of the inflated upper air bag 27. In this case, the upper and lower air bags 27 and 29 do not come into contact in the vertical direction. Accordingly, it is difficult for the upper air bag 27 to hold the head 23 of the occupant 15.

However, in this embodiment, the first bending guide structure 109 is provided. It is therefore possible to prevent the upper part 41 of the inflated lower air bag 29 from entering the vehicle rear side of the upper air bag 27 when a vehicle collision is detected or predicted.

Moreover, when the vehicle detects or predicts a collision, the upper air bag 27 is subjected to load from the occupant 15 and tries to move toward the front of the vehicle. Even in such a case, the first bending guide structure 109 comes into contact with the upper part 41 of the lower air bag 29 to prevent the movement of the upper air bag 27. It is therefore possible to maintain the relative positions of the upper and lower air bags 27 and 29 in the vehicle back-and-forth direction. The head 23 of the occupant 15 is received by the upper and lower air bags 27 and 29, and the load of the head 23 is supported by the thighs 25 of the occupant 15 or the seat surface of the seat cushion 3 with the upper and lower air bags 27 and 29 interposed therebetween. The head 23 of the occupant 15 can be thus quickly restrained.

The shoulder belt 11 is extended between the shoulder anchor 7 provided on the side including one of the right and left shoulders 17 of the seated occupant 15 and the buckle 9 provided on the other side. The first bending guide structure 109 is provided at the bottom of the inflated upper air bag body 93 so as to connect the shoulder anchor side and the buckle side of the bottom of the upper air bag body 93. Accordingly, when the upper air bag 27 is inflated, in the first bending guide structure 109, the tension T is generated between the side including the shoulder anchor 7 and the side including the buckle 9. The first bending guide structure 109 subjected to the tension T prevents the upper part 41 of the lower air bag 29 from entering the vehicle rear side of the upper air bag 27. Furthermore, it is possible to improve the guide function of guiding the upper part 41 of the lower air bag 29 so that the upper part 41 bends toward the front of the vehicle.

Moreover, when a vehicle collision is detected or predicted, the occupant 15 is subjected to inertia force so as to move toward the front of the vehicle. The upper body of the occupant 15 moves around the waist 21 restrained by the lap belt 13, and the one of the shoulders 17 of the occupant 15 on the buckle 9 side, which is not restrained by the shoulder belt 11, moves downward to the front of the vehicle by inertia force. The upper air bag 27 is therefore subjected to rotational moment M around the upper air bag attachment 28 as shown in FIG. 2. The rotational moment M is, for example, applied to the occupant 15 clockwise when viewed from the front in the case where the occupant 15 is seated at a right seat and counterclockwise when viewed from the front in the case where the occupant 15 is seated at a left seat. Because of this rotational moment M, the first bending guide structure 109 of the upper air bag 27 is subjected to the tension T. The first bending guide structure 109 subjected to the tension T then comes into contact with the inflated lower air bag 29 to prevent the upper air bag 27 from moving toward the front of the vehicle. The upper and lower air bags 27 and 29 can therefore maintain the relative positions thereof in the vehicle back-and-forth direction.

Furthermore, the upper air bag 27 is provided with the concave part 101 whose outer surface is recessed inward when the upper air bag 27 is inflated. The first bending guide structure 109 connects the ends 105 and 107 of the concave part 101 along the vehicle width direction. Accordingly, when the upper air bag 27 is supplied with the fluid 63, the pressure P due to the fluid 63 uniformly acts on the entire inner surface of the upper air bag 27 to press the concave part 101 outward. This causes tension T so as to stretch the first bending guide structure 109. The first bending guide structure 109 is further subjected to the tension T.

The first bending guide structure 109 is the uninflated portion in the upper air bag 27. Accordingly, the lower air bag 29 and first bending guide structure 109 are overlapped on each other in the vehicle back-and-forth direction when the upper and lower air bags 27 and 29 are inflated. Herein, if the first bending guide structure 109 is configured to be inflated, both the inflated lower air bag 29 and first bending guide structure 109 may give inflation force to the occupant 15. Accordingly, the configuration of the first bending guide structure 109 as the uninflated portion of the upper air bag 27 can reduce inflation force applied to the occupant 15.

The upper air bag 27 is composed of the two sheet members whose edges 95 are joined to each other. The concave part 101 is the recess 103 composed of a part of the joined portion recessed inward, and the part of the sheet members positioned in the recess 103 constitutes the first bending guide structure 109. Accordingly, the first bending guide structure 109 can be produced by only leaving a part of the edges 95 of the sheet members without cutting off the same. The work of producing the first bending guide structure 109 can be thus facilitated.

In this embodiment, the upper side of the inflated upper air bag 27 is movably supported on the shoulder belt 11. Accordingly, as shown in FIG. 8, when the upper and lower air bags 27 and 29 are inflated, the upper side of the upper air bag 27 is drawn toward the rear of the vehicle (toward the occupant 15) by the extension 123, thus preventing the upper air bag 27 from being separated from the chest 19 of the occupant 15.

Second Embodiment

Next, a description is given of a vehicle occupant protection system according to a second embodiment of the present invention. Portions thereof having same structures as those of the first embodiment are given same reference numerals, and the description thereof is omitted.

Figure 11:
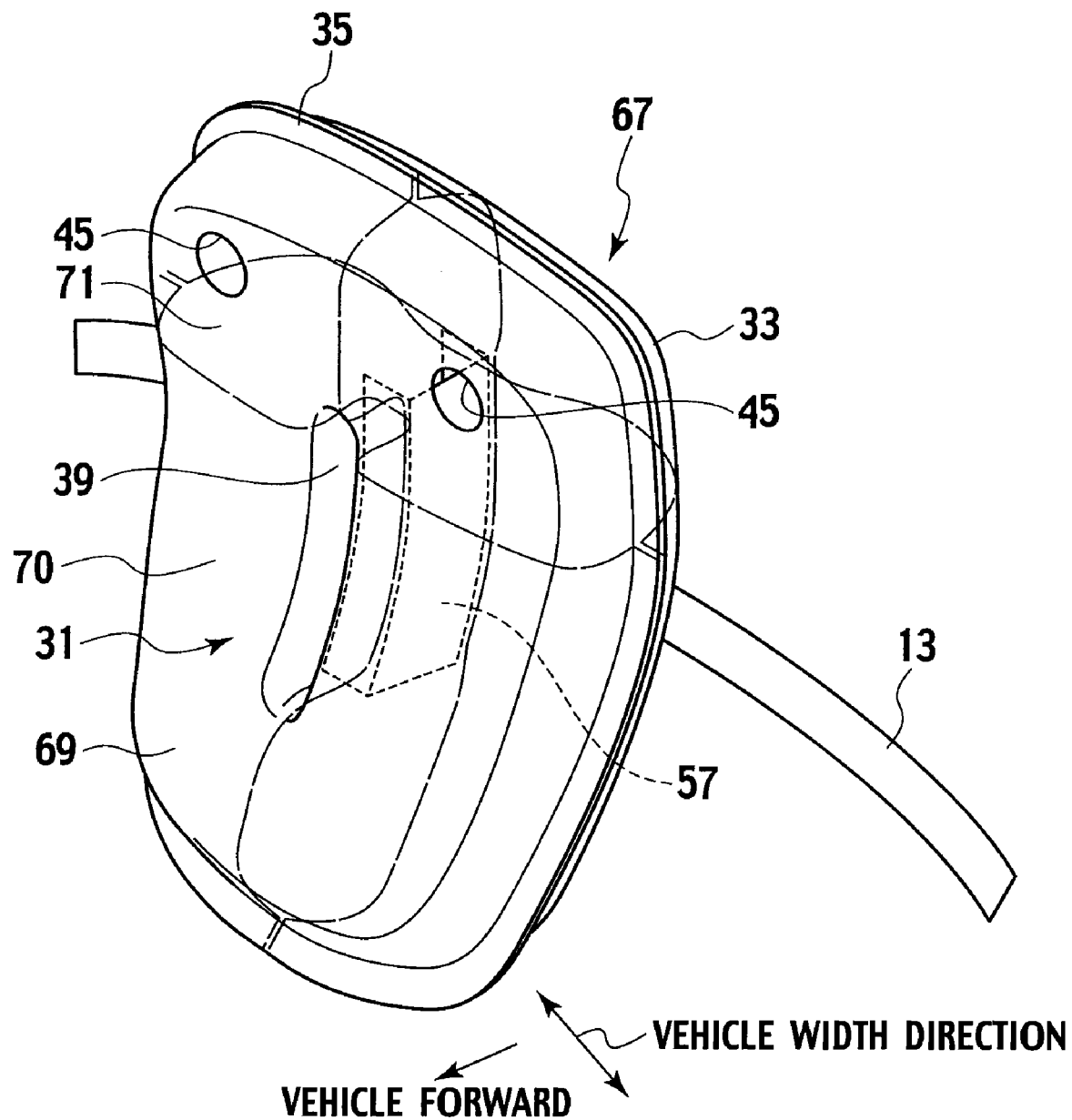
FIG. 11 is a perspective view showing a lower air bag of a vehicle occupant protection system according to a second embodiment of the present invention.

FIG. 11 is a perspective view showing a lower air bag of the vehicle occupant protection system of the second embodiment. The lower air bag 67 includes a vertically long fourth inflation limiting structure 57 in the center of the lower air bag 67 in the right-left direction (in the vehicle width direction). The fourth inflation limiting structure 57 is a sheet member having a substantially U-shaped cross section. The fourth inflation limiting structure 57 connects inner surfaces of the front and rear sheet members 31 and 33 in the vehicle back-and-forth direction. The length of the inflated lower air bag 67 in the vehicle back-and-forth direction is shorter at the part where the fourth inflation limiting structure 57 is provided than at the other part. In the outer surface of the front sheet member 31, a long depression 39 is therefore formed.

Moreover, a part of the lower air bag 67 above the upper end of the fourth inflation limiting structure 57 is referred to as an upper part 71; a part of the lower air bag 67 below the lower end of the fourth inflation limiting structure 57 is referred to as a lower part 69; and the part of the lower air bag 67 between the upper and lower parts 71 and 69 is referred to as a middle part 70.

Also in the lower air bag 67, the upper part 71 easily bends with respect to the middle part 70 at the upper end of the fourth inflation limiting structure 57 between the upper and middle parts 71 and 70. The lower part 69 also easily bends with respect to the middle part 70 at the lower end of the fourth inflation limiting structure 57 between the middle and lower parts 70 and 69. Furthermore, in the middle part 70, the vertically long fourth inflation limiting structure 57 is extended. The fourth inflation limiting structure 57 serves as a reinforcing member, and the middle part 70 therefore has a modulus of section larger than that of the upper and lower parts 71 and 69. Accordingly, the middle part 70 is resistant to bending against pressing load vertically compressing the same. Specifically, when the pressing load vertically compressing the lower air bag 67 is applied to the lower air bag 67, the upper and lower parts 71 and 69 bend to the front of the vehicle, so that the lower air bag 67 is deformed so as to have a substantially U-shape when viewed from the side.

In this embodiment, the fourth inflation limiting structure 57 is composed of the vertically long substantially U-shaped sheet member. Accordingly, when pressing force is applied from the upper air bag 27 to the lower air bag 67, the upper and lower parts 71 and 69 of the lower air bag 67 bend toward the front of the vehicle while the middle part 70 does not bend and substantially maintains the shape thereof. Accordingly, the vertical length of the bent lower air bag 67 can be maintained longer than that in the case of the first embodiment. When a vehicle collision is detected or predicted, the upper air bag 27 can be therefore placed at a higher position than that of the first embodiment.

Third Embodiment

Next, a description is given of a vehicle occupant protection system according to a third embodiment of the present invention. Portions thereof having same structures as those of the first and second embodiment are given same reference numerals, and the description thereof is omitted.

Figure 12:
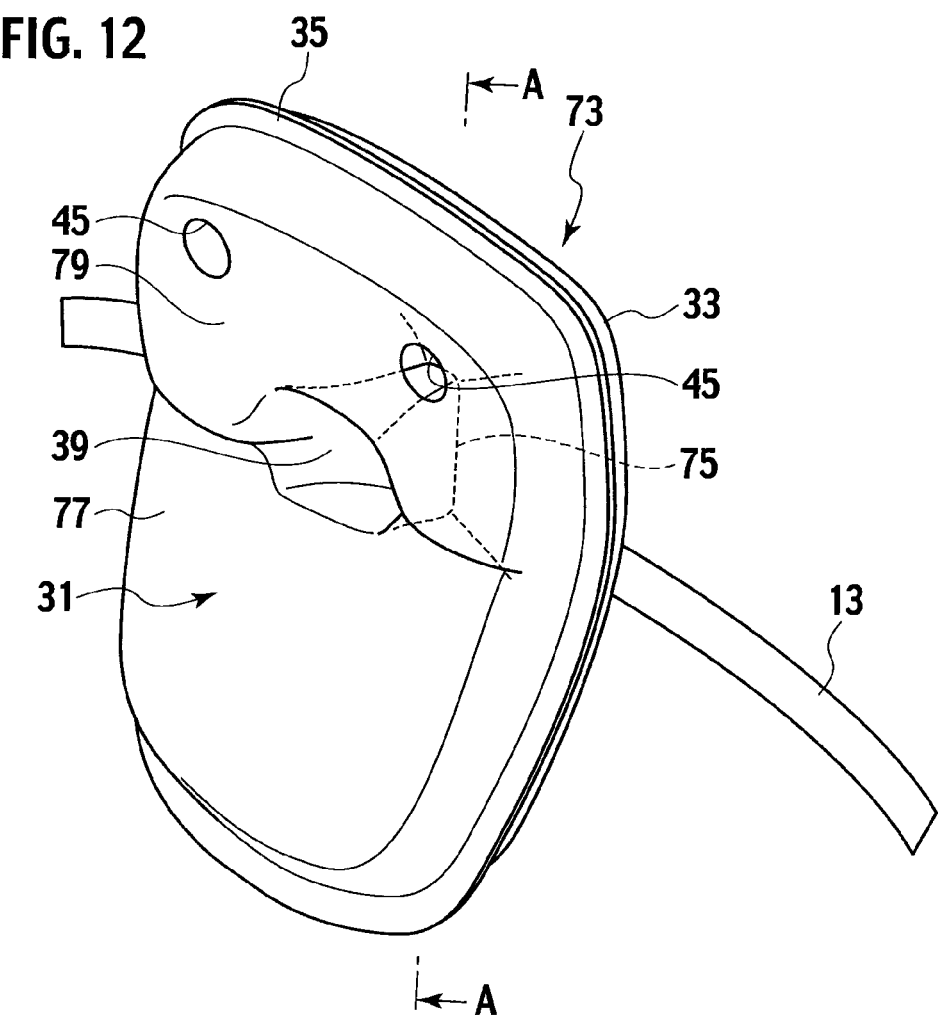
FIG. 12 is a perspective view showing a lower air bag of a vehicle occupant protection system according to a third embodiment of the present invention.
Figure 13:
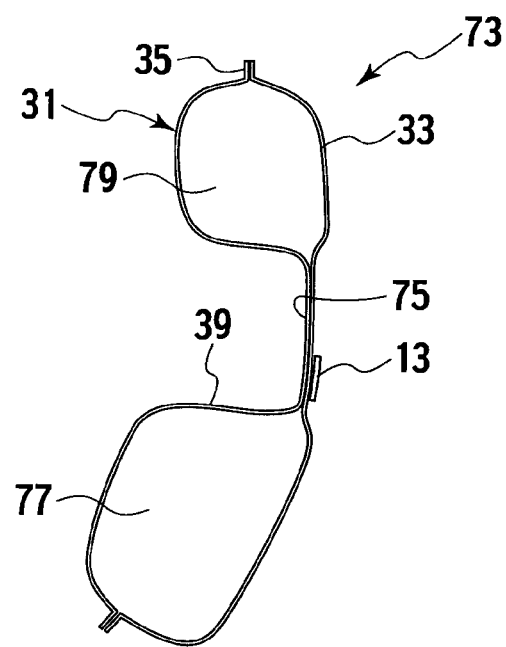
FIG. 13 is a cross-sectional view along a line A-A of FIG. 12.

FIG. 12 shows a perspective view showing a lower air bag of a vehicle occupant protection system according to the third embodiment, and FIG. 13 is a cross-sectional view along a line A-A of FIG. 12.

In the lower air bag 73, a long fifth inflation limiting structure 75 is formed. The fifth inflation limiting structure 75 is composed of the front and rear sheet members 31 and 33 which are partially joined by sewing and the like as shown in FIG. 13. A part of the lower air bag 73 above the fifth inflation limiting structure 75 is referred to as an upper part 79, and a part of the lower air bag 73 below the fifth inflation limiting structure 75 is referred to as a lower part 77.

The lower air bag 73 is also configured so that the upper part 79 easily bends with respect to the lower part 77 at the place where the fifth inflation limiting structure 75 is provided.

In this embodiment, the lower air bag 73 can be formed by only partially joining the front and rear sheet members 31 and 33 by sewing and the like. It is therefore possible to reduce working hours to produce the lower air bag 73.

Fourth Embodiment

Next, a description is given of a vehicle occupant protection system according to a fourth embodiment of the present invention. Portions thereof having same structures as those of the first to third embodiments are given same reference numerals, and the description thereof is omitted.

Figure 14:
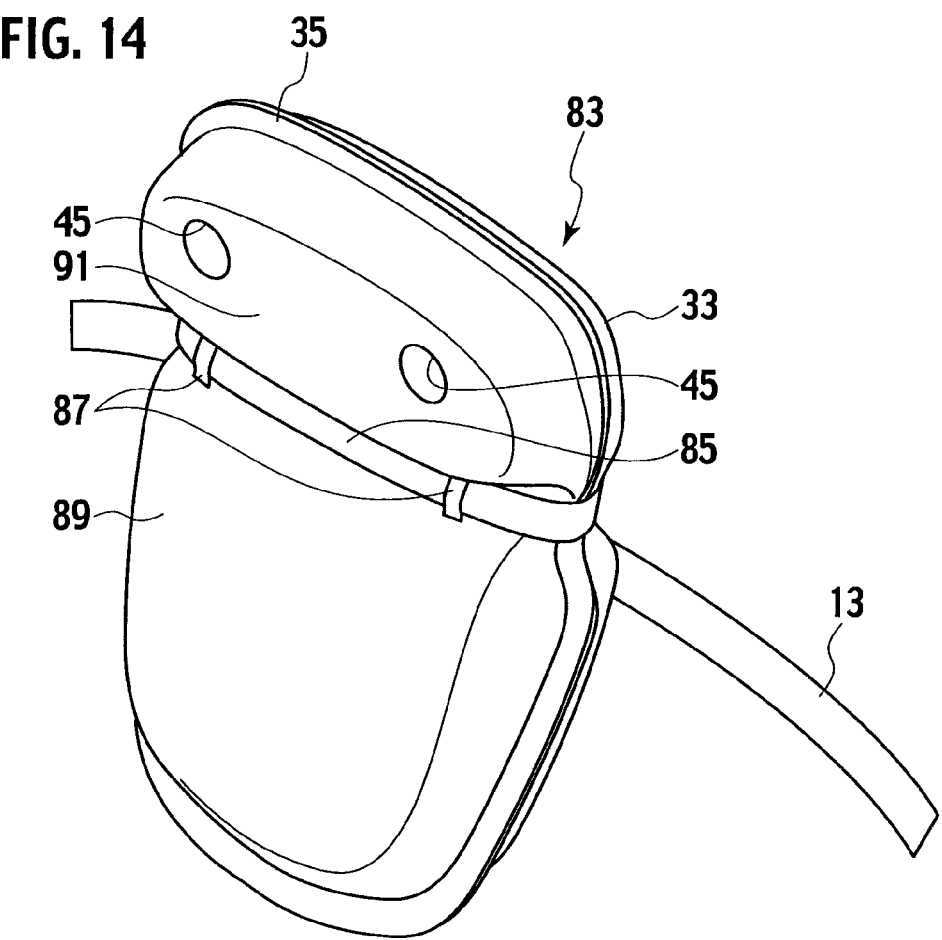
FIG. 14 is a perspective view showing a lower air bag of a vehicle occupant protection system according to a fourth embodiment of the present invention.

FIG. 14 is a perspective view showing a lower air bag of the vehicle occupant protection system of the fourth embodiment.

In the lower air bag 83, a sixth inflation limiting structure 85 is provided around the outer circumference. The sixth inflation limiting structure 85 is a belt member shorter than the outer circumference of the lower air bag 83 and is attached to the lower air bag 83 through stoppers 87. Moreover, a part of the lower air bag 83 above the sixth inflation limiting structure 85 is referred to as an upper part 91, and a part of the lower air bag 83 below the sixth inflation limiting structure 85 is referred to as a lower part 89.

The circumferential length of the lower air bag 83 is shorter at the part where the sixth inflation limiting structure 85 is provided than at the other part. Accordingly, the lower air bag 83 is configured so that the upper part 91 easily bends with respect to the lower part 89 at the part where the sixth inflation limiting structure 85 is provided.

In this embodiment, the sixth inflation limiting structure 85 is composed of the belt member. Accordingly, the length of the inflated lower air bag 83 in the vehicle width direction can be set short as well as the length thereof in the vehicle back-and-forth direction. Moreover, the predetermined circumferential length can be easily provided by freely changing the length of the belt member.

Fifth Embodiment

Next, a description is given of a vehicle occupant protection system according to a fifth embodiment of the present invention. Portions thereof having same structures as those of the first to fourth embodiments are given same reference numerals, and the description thereof is omitted.

Figure 15:
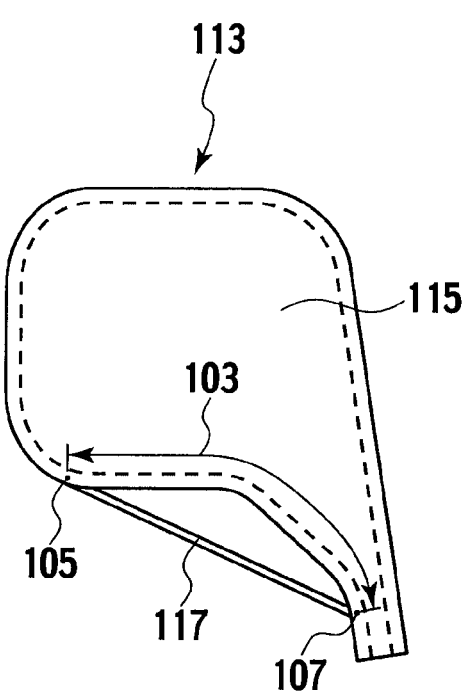
FIG. 15 is a front view showing an uninflated upper air bag provided with a second bending guide structure according to a fifth embodiment of the present invention.

FIG. 15 is a front view showing an upper air bag provided with a second bending guide structure according to the fifth embodiment.

The upper air bag 113 is composed of an upper air bag body 115 and a second bending guide structure 117. The second bending guide structure 117 is a linear member connecting the ends 105 and 107 of the recess 103 of the upper air bag body 115. The second bending guide structure 117 can be various linear members such as non-stretch cord. The both ends of the second bending guide structure 117 are attached to the upper air bag body 115 by sewing and the like.

In this embodiment, the second bending guide structure 117 is composed of the linear member. Accordingly, the length of the second bending guide structure 117 can be easily changed.

The entire content of a Japanese Patent Application No. P2008-123394 with a filing date of May 9, 2008 is herein incorporated by reference.

Although the invention has been described above by reference to certain embodiments of the invention, the invention is not limited to the embodiments described above and modifications may become apparent to these skilled in the art, in light of the teachings herein. The scope of the invention is defined with reference to the following claims.

What is claimed is:

1. A vehicle occupant protection system comprising:
   a seat belt apparatus comprising: a shoulder belt restraining an occupant of a vehicle diagonally from one of shoulders to a chest; and a lap belt restraining a waist of the occupant;
   an upper air bag which is housed in the shoulder belt, and is inflated from the shoulder belt toward a front of the vehicle upon detection or prediction of a vehicle collision;
   a lower air bag which is housed in the lap belt, and is inflated from the lap belt toward the front of the vehicle upon detection or prediction of the vehicle collision; and
   an inflation limiting structure which is provided in the lower air bag and limits inflation of a part of the lower air bag in a vehicle back-and-forth direction when the lower air bag is inflated,
   wherein when the vehicle collision is detected or predicted, the upper and lower air bags are inflated and vertically come into contact with each other, and an upper part of the inflated lower air bag positioned above the inflation limiting structure is pressed by the upper air bag and bends toward the front of the vehicle at the inflation limiting structure.

2. The vehicle occupant protection system according to claim 1,
   wherein the lower air bag is attached to the lap belt through a lower air bag attachment, and
   the inflation limiting structure is placed above the lower air bag attachment when the lower air bag is inflated.

3. The vehicle occupant protection system according to claim 1,
   wherein the lower air bag has a vent hole through which fluid in the lower air bag is discharged toward the front of the vehicle when the upper part of the lower air bag is bent toward the front of the vehicle at the inflation limiting structure.

4. The vehicle occupant protection system according to claim 3,
   wherein the vent hole is provided on the upper part of the lower air bag.

5. The vehicle occupant protection system according to claim 1,
   wherein the upper air bag comprises a bending guide structure which serves as a guide allowing the upper part of the inflated lower air bag to bend toward the front of the vehicle.

6. The vehicle occupant protection system according to claim 5,
   wherein when the upper and lower air bags are inflated and vertically come into contact with each other, the bending guide structure is extended from a bottom of an upper air bag body of the inflated upper air bag and is placed on the vehicle rear side of the upper part of the inflated lower air bag.

7. The vehicle occupant protection system according to claim 6,
   wherein the shoulder belt is extended from a shoulder anchor provided on a side of one of the right and left shoulders of the seated occupant to a buckle provided on the other side of the right and left shoulders, and
   the bending guide structure is provided at the bottom of the inflated upper air bag body to connect a shoulder anchor side and a buckle side of the bottom of the inflated upper air bag body.

8. The vehicle occupant protection system according to claim 5,
   wherein the inflated upper air bag is provided with a concave part whose outer surface is recessed inward of the inflated upper air bag, and
   the bending guide structure connects both ends of the concave part in a vehicle width direction.

9. The vehicle occupant protection system according to claim 5,
wherein the bending guide structure is not inflated when the upper air bag body of the upper air bag is inflated.

10. The vehicle occupant protection system according to claim 8,
wherein the upper air bag further comprises two sheet members joined to each other,
the concave part is composed of a part of a joined portion of the two sheet members, which is recessed inward of the upper air bag, and
the bending guide structure is composed of a part of the sheet members placed in the concave part.

11. The vehicle occupant protection system according to claim 1,
wherein an upper part of the inflated upper air bag is movably supported by the shoulder belt.

12. A vehicle occupant protection system comprising:
a seat belt apparatus comprising: a shoulder belt restraining an occupant of a vehicle diagonally from one of shoulders to a chest; and a lap belt restraining a waist of the occupant;
an upper air bag which is housed in the shoulder belt, and is inflated from the shoulder belt toward a front of the vehicle upon detection or prediction of a vehicle collision;
a lower air bag which is housed in the lap belt, and is inflated from the lap belt toward the front of the vehicle upon detection or prediction of the vehicle collision; and
inflation limiting means provided in the lower air bag, the inflation limiting means for limiting inflation of a part of the lower air bag in a vehicle back-and-forth direction when the lower air bag is inflated,
wherein when the vehicle collision is detected or predicted, the upper and lower air bags are inflated and vertically come into contact with each other, and an upper part of the inflated lower air bag positioned above the inflation limiting means is pressed by the upper air bag and bends toward the front of the vehicle at the inflation limiting means.

* * * * *

UNITED STATES PATENT AND TRADEMARK OFFICE
CERTIFICATE OF CORRECTION

| | | |
|---|---|---|
| PATENT NO. | : 7,669,891 B2 | Page 1 of 1 |
| APPLICATION NO. | : 12/434946 | |
| DATED | : March 2, 2010 | |
| INVENTOR(S) | : Seiji Azuma et al. | |

It is certified that error appears in the above-identified patent and that said Letters Patent is hereby corrected as shown below:

Title Page, insert

--(30) Foreign Application Priority Data
May 9, 2008 (JP)................ 2008-123394--

Signed and Sealed this

Twentieth Day of July, 2010

David J. Kappos
*Director of the United States Patent and Trademark Office*